US012726914B2

(12) United States Patent
Feng et al.

(10) Patent No.: US 12,726,914 B2
(45) Date of Patent: Sep. 1, 2026

(54) PORT SPECIFIC SOUNDING REFERENCE SIGNAL TRANSMIT POWER CALCULATION

(71) Applicant: Apple Inc., Cupertino, CA (US)

(72) Inventors: Bin Feng, Beijing (CN); Vijay Venkataraman, San Jose, CA (US); Sanjeevi Balasubramanian, San Jose, CA (US); Yu Wu, Beijing (CN); Dhiraj J. Shirke, San Jose, CA (US); Han Pu, Shanghai (CN); ChunLei Lin, Hong Kong (HK); Xu Sun, Beijing (CN); Pranav Tripathi, San Jose, CA (US); Hao Sun, Beijing (CN)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 18/835,680

(22) PCT Filed: Sep. 1, 2023

(86) PCT No.: PCT/CN2023/116479

§ 371 (c)(1), (2) Date: Aug. 2, 2024

(87) PCT Pub. No.: WO2025/043702

PCT Pub. Date: Mar. 6, 2025

(65) Prior Publication Data

US 2026/0006561 A1 Jan. 1, 2026

(51) Int. Cl.

*H04W 52/32* (2009.01)
*H04W 52/36* (2009.01)
*H04W 52/42* (2009.01)

(52) U.S. Cl.

CPC ....... *H04W 52/325* (2013.01); *H04W 52/367* (2013.01); *H04W 52/42* (2013.01)

(58) Field of Classification Search

None

See application file for complete search history.

(56) References Cited

U.S. PATENT DOCUMENTS

| | | | | |
|---|---|---|---|---|
| 9,806,926 | B2 * | 10/2017 | Xu | H04B 7/0626 |
| 10,848,209 | B2 * | 11/2020 | Yang | H04W 52/367 |

(Continued)

FOREIGN PATENT DOCUMENTS

| | | | | | |
|---|---|---|---|---|---|
| EP | 2484161 | B1 * | 3/2019 | | H04W 72/21 |
| EP | 3751891 | A1 * | 12/2020 | | H04W 72/23 |

(Continued)

OTHER PUBLICATIONS

International Search Report for PCT/CN2023/116479; May 14, 2024.

Ericsson "SRS power scaling for UL power control"; 3GPP TSG-RAN WG1 Meeting #95 R1-1813478; Nov. 16, 2018.

*Primary Examiner* — Hai V Nguyen

(74) *Attorney, Agent, or Firm* — Kowert, Hood, Munyon, Rankin & Goetzel, P.C.

(57) ABSTRACT

This disclosure relates to techniques for performing uplink port selection management in a wireless communication system. A sounding reference signal transmit power calculation method may be selected by a wireless device from multiple possible methods, potentially based on a number of uplink multiple input multiple output transmission layers configured for the wireless device. Sounding reference signal transmit powers for a first antenna port and a second antenna port may be determined using the selected sounding reference signal transmit power calculation method. Sounding reference signals may be transmitted using the first antenna port and the second antenna port at the determined sounding reference signal transmit powers.

20 Claims, 10 Drawing Sheets

(56) References Cited

U.S. PATENT DOCUMENTS 11,516,755 B2 * 11/2022 Sridharan ............. H04L 5/0048
11,627,536 B2 * 4/2023 Jung .................... H04B 7/0617
370/252
11,831,579 B2 * 11/2023 Rajagopal ............ H04B 7/0456
12,069,592 B2 * 8/2024 Huang .................. H04W 52/14
12,166,541 B2 * 12/2024 Harrison ............... H04W 52/08
12,200,640 B2 * 1/2025 Sridharan ............... H04W 8/24
12,414,051 B2 * 9/2025 Nguyen .............. H04W 52/146
12,425,977 B2 * 9/2025 Jin ...................... H04W 52/146
2010/0246561 A1 * 9/2010 Shin ..................... H04B 7/0691
375/267
2011/0096815 A1 * 4/2011 Shin ...................... H04W 52/42
375/219
2015/0215793 A1 * 7/2015 Siomina ................ H04W 64/00
455/456.1
2020/0112349 A1 * 4/2020 Yang .................... H04B 7/0404
2020/0154362 A1 * 5/2020 Shi ........................ H04L 5/0023
2020/0162133 A1 * 5/2020 Harrison ............. H04W 52/248
2020/0366532 A1 * 11/2020 Brunel ................ H04L 27/2646
2021/0153143 A1 * 5/2021 Sridharan ............... H04W 8/24
2021/0168731 A1 * 6/2021 Jung ..................... H04W 52/24
2022/0182950 A1 * 6/2022 Huang .................. H04L 5/0051
2022/0330162 A1 * 10/2022 Meshkati .............. H04L 5/0051
2023/0045623 A1 * 2/2023 Chen ..................... H04W 52/54
2023/0121938 A1 * 4/2023 Zhou .................. H04B 7/06964
375/347
2023/0180142 A1 * 6/2023 Nguyen .............. H04W 52/242
455/522
2023/0269669 A1 * 8/2023 Jin ...................... H04W 52/367
455/522
2023/0276373 A1 * 8/2023 Chen ..................... H04L 5/0051
370/318
2023/0413188 A1 * 12/2023 Seo ...................... H04B 17/328
2024/0023053 A1 * 1/2024 Guo ...................... H04L 5/0051
2024/0373214 A1 * 11/2024 Elshafie .................. H04L 9/001
2024/0429991 A1 * 12/2024 Yuan ..................... H04L 5/0023
2025/0062796 A1 * 2/2025 Harrison ............. H04W 52/248
2025/0112674 A1 * 4/2025 Feng .................... H04B 7/0426
2025/0294463 A1 * 9/2025 Arvola .................. H04W 52/42
2026/0066964 A1 * 3/2026 Feng .................... H04B 7/0608
2026/0081653 A1 * 3/2026 Zhang .................... H04B 7/061

FOREIGN PATENT DOCUMENTS

EP 3100367 B1 * 8/2022 ........... H04B 7/0686
WO WO-2010107880 A2 * 9/2010 .......... H04W 52/242
WO WO-2022208486 A1 * 10/2022 ........... H04L 5/0091

* cited by examiner

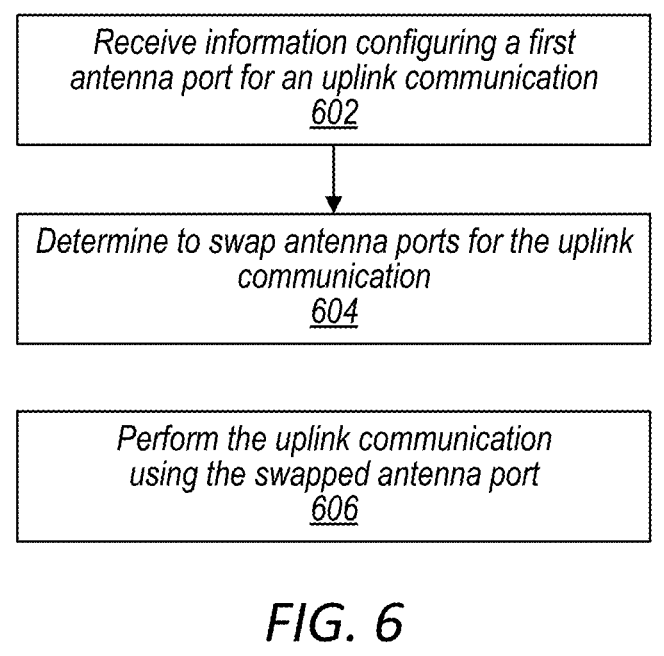

Receive information configuring a first antenna port for an uplink communication
602

Determine to swap antenna ports for the uplink communication
604

Perform the uplink communication using the swapped antenna port
606

FIG. 6

Dual Layer Mode:

Port0/Tx0 — PUSCH Tx0 (25dBm)

Port1/Tx1 — PUSCH Tx1 (25dBm)

SRS may reflect PUSCH uplink status

| Dual Layer Mode | Port0 | Port1 |
|---|---|---|
| SRS Power | 25dBm | 25dBm |
| PUSCH MTPL | 25dBm | 25dBm |

Single Layer Mode:

Port0/Tx0 — PUSCH Tx0 (26.5dBm)

Port1/Tx1

Port0/Tx0

Port1/Tx1 — PUSCH Tx1 (28dBm)

SRS may NOT reflect PUSCH uplink status

| Single Layer Mode | Port0 | Port1 |
|---|---|---|
| SRS Power | 25dBm | 25dBm |
| PUSCH MTPL | 26.5dBm | 28dBm |

PORT SPECIFIC SOUNDING REFERENCE SIGNAL TRANSMIT POWER CALCULATION

PRIORITY CLAIM

This application is a national phase entry of PCT Application No. PCT/CN2023/116479, entitled "Port Specific Sounding Reference Signal Transmit Power Calculation," filed Sep. 1, 2023, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for a wireless device to manage its uplink port selection in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS) and are capable of operating sophisticated applications that utilize these functionalities. Some examples of wireless communication standards include GSM, UMTS (associated with, for example, WCDMA or TD-SCDMA air interfaces), LTE, LTE Advanced (LTE-A), 5G NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever-increasing number of features and functionality introduced in wireless communication devices also creates a continuous need for improvement in both wireless communications and in wireless communication devices. Ensuring accuracy of transmitted and received signals through wireless devices is important. Increasing the functionality of a UE device can place a significant strain on the battery life of the UE device. Thus, UE power reduction while maintaining sufficient transmit and receive capabilities are important considerations.

SUMMARY

Embodiments are presented herein of apparatuses, systems, and methods for a wireless device to manage its uplink port selection in a wireless communication system.

According to the techniques described herein, a wireless device may use port specific sounding reference signal transmit power calculation when single layer uplink multiple input multiple output (MIMO) operation is configured. This may result in different transmit powers being used for different antenna ports when such operation is configured, for example if relevant characteristics such as maximum transmit power levels differ between the different antenna ports. This may result in the sounding reference signal transmissions providing a more accurate representation of the potential performance of the antenna ports of the wireless device than if equal sounding reference signal transmit power were used for the different antenna ports, at least in some instances.

Techniques are also described herein for a wireless device to determine when a different antenna port is likely to provide better performance than the currently selected antenna port for single layer uplink MIMO operation, and to swap antenna ports accordingly to attempt to achieve that better performance. The techniques may make use of wireless device specific information, which may include either or both of fixed wireless device characteristics (which could include maximum transmit power levels for the different antenna ports of the wireless device) or dynamic/transient wireless device conditions (such as a hand grip condition that affects different antenna ports of the wireless device differently) to perform such antenna port swapping autonomously and transparently to the serving cell of the wireless device, at least in some instances.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 5-6 are flowchart diagrams illustrating aspects of example methods for wireless device to manage its uplink port selection in a wireless communication system, according to some embodiments;

Figure 1:
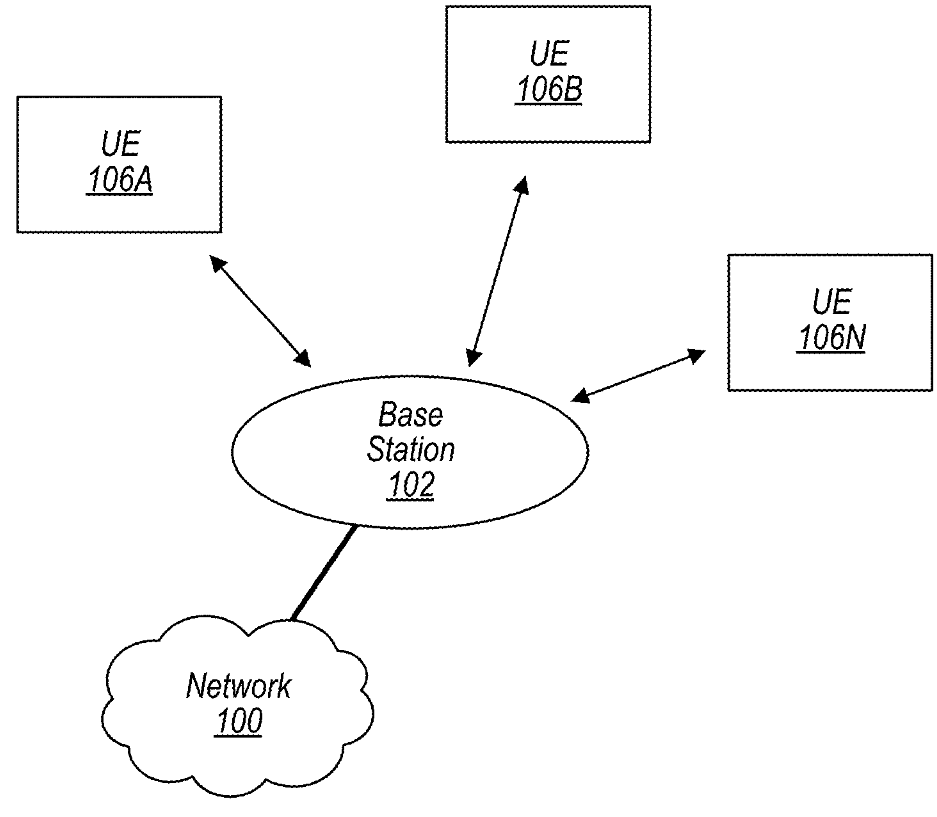
FIG. 1 illustrates an example (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
LTE: Long Term Evolution
NR: New Radio
TX: Transmission/Transmit
RX: Reception/Receive
RAT: Radio Access Technology
TRP: Transmission-Reception-Point

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well as any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
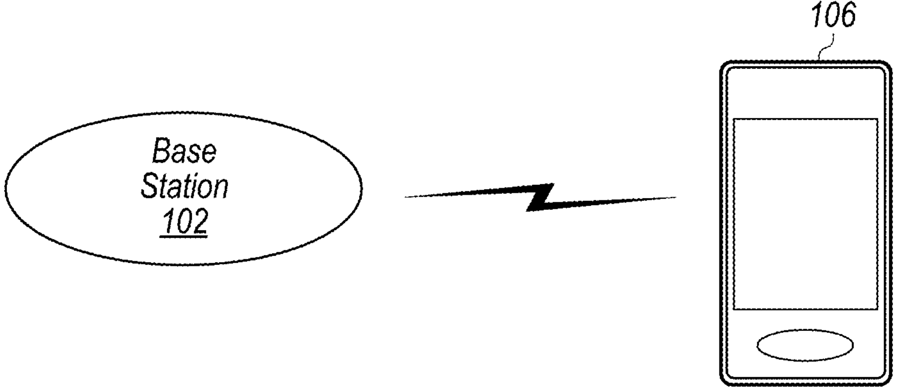
FIG. 2 illustrates an example base station in communication with an example wireless user equipment (UE) device, according to some embodiments.

FIGS. 1 and 2—Example Communication System

FIG. 1 illustrates an example (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

Note that, at least in some 3GPP NR contexts, base station (gNB) functionality can be split between a centralized unit (CU) and a distributed unit (DU). The illustrated base station 102 may support the functionality of either or both of a CU or a DU, in such a network deployment context, at least according to some embodiments. In some instances, the base station 102 may be configured to act as an integrated access and backhaul (IAB) donor (e.g., including IAB donor CU and/or IAB donor DU functionality). In some instances, the base station 102 may be configured to act as an IAB node (e.g., including IAB mobile termination (MT) and IAB-DU functionality). Other implementations are also possible.

The base station 102 and the user devices may be configured to communicate over the transmission medium using any of various radio access technologies (RATs), also referred to as wireless communication technologies, or telecommunication standards, such as LTE, LTE-Advanced (LTE-A), LAA/LTE-U, 5G NR, Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform techniques for managing its uplink port selection in a wireless communication system, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an example user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of LTE, LTE-A, 5G NR, Wi-Fi, BLUETOOTH™, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or NR, and separate radios for communicating using each of Wi-Fi and BLUETOOTH™. Other configurations are also possible.

Figure 3:
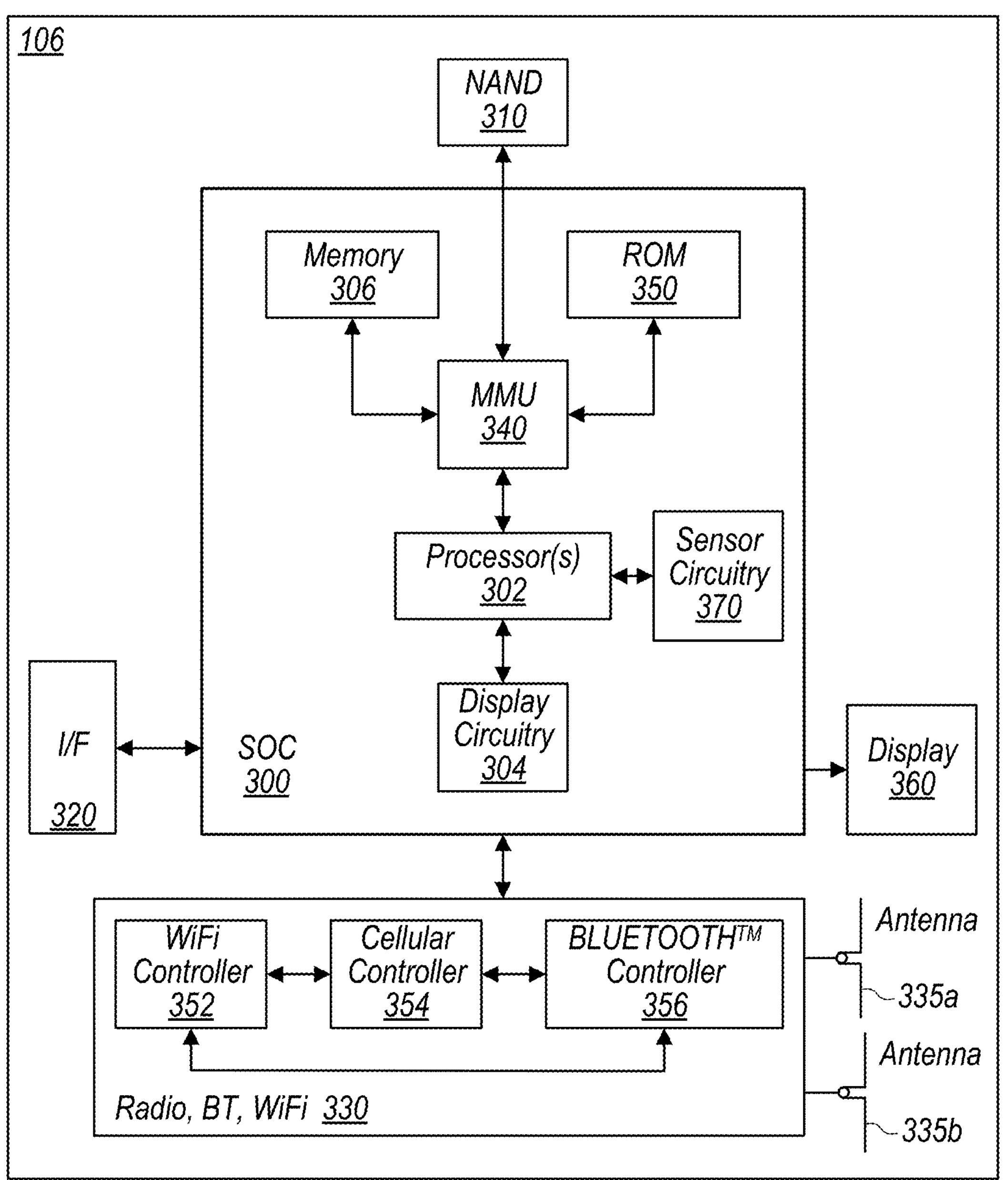
FIG. 3 illustrates an example block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. Some or all of the various illustrated components (and/or other device components not illustrated, e.g., in variations and alternative arrangements) may be "communicatively coupled" or "operatively coupled," which terms may be taken herein to mean components that can communicate, directly or indirectly, when the device is in operation.

As shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include or couple to at least one antenna (e.g., 335*a*), and possibly multiple antennas (e.g., illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. The communication circuitry may include multiple receive chains and/or multiple transmit chains for receiving and/or transmitting multiple spatial streams, such as in a multiple-input multiple output (MIMO) configuration. As noted above, the UE may be configured to communicate wirelessly using multiple wireless communication standards in some embodiments.

The UE 106 may include hardware and software components for implementing methods for the UE 106 to perform techniques for managing its uplink port selection in a wireless communication system, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform techniques for managing uplink port selection in a wireless communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
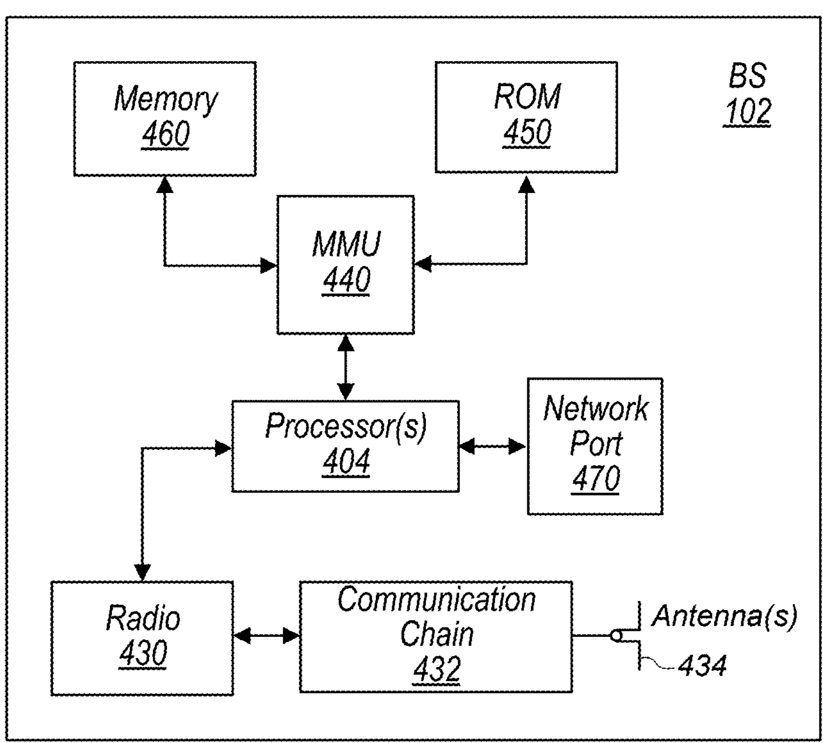
FIG. 4 illustrates an example block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transmission and reception points (TRPs). In addition, a UE capable of operating according to 5G NR may be connected to one or more TRPs within one or more gNBs.

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, 5G NR, 5G NR SAT, LTE, LTE-A, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, 5G NR SAT and Wi-Fi, LTE and Wi-Fi, etc.).

As described further subsequently herein, the BS 102 may include hardware and software components for implementing or supporting implementation of features described herein. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network(s), e.g., it may include at least one Ethernet port, and radio 430 may be designed to communicate according to the Wi-Fi standard.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
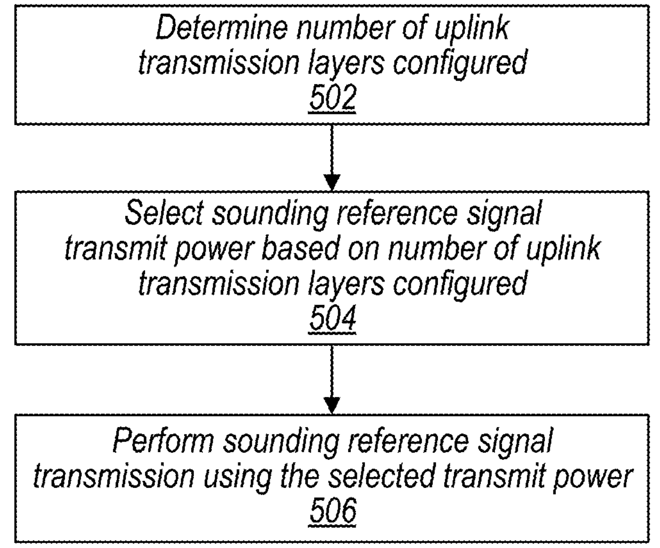

FIG. 5—Uplink Port Selection Management

Antenna port selection for a wireless device by a base station (e.g., transmit precoder matrix indicator (TPMI)) may result in a performance downgrade. Differing antenna port characteristics between antenna ports of the wireless device, e.g., different maximum power transmit levels (MPTLs), may cause such performance downgrades. For example, if sounding reference signals (SRS) are transmitted by a wireless device with equal power on different antenna ports even though those antenna ports have different MPTLs, the SRS received by the cellular base station may not by itself fully reflect the best antenna port for the wireless device to use to perform uplink transmission.

Thus, it may be beneficial to specify techniques for a wireless device to manage its uplink port selection, for example in view of antenna port specific characteristics for the wireless device. To illustrate some such sets of possible techniques, FIGS. 5-6 are flowchart diagrams illustrating methods for uplink port selection management in a wireless communication system, at least according to some embodiments.

Aspects of the methods of FIGS. 5-6 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the methods of FIGS. 5-6 are described in a manner relating to the use of communication techniques and/or features associated with 3GPP and/or NR specification documents, such description is not intended to be limiting to the disclosure, and aspects of the methods of FIGS. 5-6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the methods of FIGS. 5-6 may operate as follows.

The wireless device may establish a wireless link with a cellular base station. According to some embodiments, the wireless link may include a cellular link according to 5G NR. For example, the wireless device may establish a session with an AMF entity of the cellular network by way of one or more gNBs that provide radio access to the cellular network. As another possibility, the wireless link may include a cellular link according to LTE. For example, the wireless device may establish a session with a mobility management entity of the cellular network by way of an eNB that provides radio access to the cellular network. Other types of cellular links are also possible, and the cellular network may also or alternatively operate according to another cellular communication technology, according to various embodiments.

Establishing the wireless link may include establishing a RRC connection with a serving cellular base station, at least according to some embodiments. Establishing the first RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

At least according to some embodiments, the wireless device may establish multiple wireless links, e.g., with multiple TRPs of the cellular network, according to a multi-TRP configuration. In such a scenario, the wireless device may be configured (e.g., via RRC signaling) with one or more transmission control indicators (TCIs), e.g., which may correspond to various beams that can be used to communicate with the TRPs. Further, it may be the case that one or more configured TCI states may be activated by media access control (MAC) control element (CE) for the wireless device at a particular time.

At least in some instances, establishing the wireless link(s) may include the wireless device providing capability information for the wireless device. Such capability information may include information relating to any of a variety of types of wireless device capabilities.

In 502, a number of configured multiple input multiple output (MIMO) uplink transmission layers may be determined. In some embodiments, MIMO uplink transmission may be configured for the wireless device for one layer (single layer) or two layers (dual layer). In single layer mode, it may be the case that one antenna of the wireless device is used to perform uplink data transmission with one spatial layer. In the dual layer mode, it may be the case that two antennas of the wireless device are used to perform uplink data transmission with two spatial layers. The configuration may include provision of a TPMI, which may be indexed to cither a single layer configuration or a dual layer configuration. The configuration may include antenna port weightings for antenna ports of the wireless device. For example, for a single layer configuration, it may be the case that a TPMI indicates to weight a first antenna port at 'l' and a second antenna port at '0' to indicate to use the first antenna port and not the second antenna port for the uplink MIMO communication, while a TPMI indexed to a configuration with the first antenna port weighted at '0' and the second antenna port weighted at '1' may indicate to use the second antenna port and not the first antenna port for the uplink MIMO communication. As another example, for a dual layer configuration, a TPMI could be provided that is indexed to a configuration with equal weights for the first antenna port and the second antenna port. Other configurations (e.g., including configurations for wireless devices with more than 2 antenna ports) are also possible.

In 504, a sounding reference signal (SRS) transmit power may be determined based at least in part on the number of MIMO uplink transmission layers configured. The SRS transmit power may be determined for each of the antenna ports (e.g., including at least the first antenna port and the second antenna port) for the wireless device, in some embodiments. The SRS transmit power may be determined based at least in part on maximum transmit power levels for the antenna ports of the wireless device, and may be determined in different ways depending on whether single layer MIMO uplink transmission is configured or dual layer MIMO uplink transmission is configured, according to various embodiments.

In some embodiments, the SRS transmit power may be jointly determined for the first antenna port and the second antenna port when two MIMO uplink transmission layers are configured. For example, joint calculation of the SRS transmit power for the first antenna port and the SRS transmit power for the second antenna port may include determining the lesser value of the maximum transmit power level for the first antenna port and the maximum transmit power level for the second antenna port. This lesser value may further be reduced by a certain amount (e.g., 3 dB, as one possibility), and the resulting value may be used as the jointly determined SRS transmit power for the first antenna port and the second antenna port.

In some embodiments, the SRS transmit power may be separately/independently determined for the first antenna port and the second antenna port when one MIMO uplink transmission layer is configured. For example, the SRS transmit power for the first antenna port may be calculated as the maximum transmit power level for the first antenna port reduced by a certain amount (e.g., 3 dB, as one possibility). Similarly, the SRS transmit power for the second antenna port may be calculated as the maximum transmit power level for the second antenna port reduced by the same amount. Thus, the SRS transmit power for the first antenna port may be different than the SRS transmit power for the second antenna port, e.g., in scenarios in which the maximum transmit power level for the first antenna port is different than the maximum transmit power level for the second antenna port. Note that other techniques for determining the SRS transmit powers for the first antenna port and the second antenna port (e.g., based on the maximum transmit power levels for the first antenna port and the second antenna port and/or other characteristics) may also or alternatively be used, as desired.

In 506, the wireless device may perform a SRS transmission using the first antenna port and the second antenna port using the determined SRS transmit power. This may include performing a SRS transmission while in single layer MIMO uplink mode using the first antenna port at the SRS transmit power determined for the first antenna port and using the second antenna port at the (e.g., separately determined and potentially different) SRS transmit power determined for the second antenna port. Alternatively, or in addition (e.g., at a different time), this may include performing a SRS transmission while in dual layer MIMO uplink mode using the first antenna port and the second antenna port at the jointly determined SRS transmit power for the first antenna port and the second antenna port.

Thus, the method of FIG. 5 may be used to perform port specific SRS power calculation, which may improve the effectiveness of antenna port selection for a wireless device performing uplink MIMO communication, potentially in particular for single transmission layer mode, at least according to some embodiments. Whether such techniques are used or other SRS power calculation techniques are used, it may be possible for antenna port selection configured by the cellular network to provide poor performance. The method of FIG. 6 may provide techniques for a wireless device to detect such a scenario, and to autonomously swap antenna ports for an uplink MIMO communication if it can be determined that a different antenna is likely to provide better performance, at least according to some embodiments.

In 602, information configuring a first antenna port for an uplink communication may be received. The uplink communication may include a single layer MIMO uplink communication, in some embodiments. The information configuring the first antenna port for the uplink communication may include a TPMI corresponding to use of the first antenna port, as one possibility. In some embodiments, the first antenna port may be selected based at least in part on SRS transmitted by the wireless device; for example, the network may select the antenna port for the uplink communication (e.g., from at least the first antenna port and a second antenna port) based at least in part on the relative received signal strengths of one or more SRS transmissions by the wireless device. At least according to some embodiments, the first antenna port may be associated with a first antenna of the wireless device, while a second antenna port of the wireless device may be associated with a second antenna of the wireless device.

In 604, the wireless device may determine to swap antenna ports for the uplink communication. Swapping the antenna ports may change which antenna of the wireless device is associated with which antenna port; thus, after swapping, it may be the case that the first antenna port is associated with the second antenna, while the second antenna port is associated with the first antenna, at least according to some embodiments. The decision to swap antenna ports may be based on any of a variety of possible considerations, according to various embodiments. At least in some instances, the decision may be based on information available to the wireless device that is indicative that the second antenna may be likely to perform better than the first antenna, such that the uplink communication may be more likely to be successfully received if it is transmitted using the second antenna instead of the first antenna. The decision could be based on any or all of maximum transmit power levels for either or both of the first antenna port or the second antenna port (which, as previously noted, may be different), reference signal received power (RSRP) levels for either or both of the first antenna port or the second antenna port, an error rate for (e.g., recent) previous uplink communication using the first antenna port, and/or one or more wireless device conditions such as a hand grip condition for the wireless device.

In some embodiments, the decision may be based on one or more configured conditions being met at the wireless device. Some such conditions could depend on one or more calculated metric values for the antenna ports of the wireless device. As one such possible metric, a combination of the maximum transmit power level and the RSRP for a given antenna port may be referred to as a "rank" metric for that antenna port, in some embodiments. Such a rank metric may be used to compare the first antenna port and the second antenna port, as one possibility. For example, the wireless device may determine to swap antenna ports (e.g., such that the second antenna can be used to perform the communication configured for the first antenna port) if the rank for the second antenna port is better than the rank for the first antenna port by at least a certain ("first") threshold. Such a metric may also or alternatively be used in combination with other metrics, such as the error rate for the first antenna port (or, more generally, the configured antenna port) to determine whether to swap antenna ports. For example, the wireless device may determine to swap antenna ports if the rank for the second antenna port is better than the rank for the first antenna port by at least a certain ("second") threshold and the error rate for the first antenna port is greater than a configured error rate threshold. In some embodiments, both such conditions may be possible triggers for swapping antenna ports; for example, the first threshold may be larger than the second threshold, such that a smaller difference in ranks combined with a significant error rate at the first antenna port may be sufficient to trigger an antenna port swap, or a larger difference in ranks may be sufficient to trigger an antenna port swap even with a relatively small error rate at the first antenna port.

Still another possible condition that could trigger the antenna port swap could include a hand grip based condition. For example, the wireless device may have one or more sensors configured to perform measurements and make determinations as to the hand grip in use for the wireless device. The baseband layer may receive information indicating a current hand grip, such as whether the hand grip may be impacting baseband operations. For example, a hand grip condition may be associated with one or more antenna elements being obstructed or otherwise experiencing signal strength attenuation, interference, or other negative conditions. Thus, a hand grip condition may be detected indicating that the first antenna port is more obstructed by a hand grip of a user of the wireless device than the second antenna port, and the wireless device could determine to swap antenna ports based at least in part on such a condition.

Note that the various conditions described herein as potentially being usable for determining whether to swap antenna ports for an uplink communication, as well as numerous other such possible conditions, may be used separately or in any of various combinations, as desired.

In 606, the uplink communication may be performed using the second antenna. The second antenna may be used to perform the uplink communication even though the wireless device may be been configured (e.g., by a serving cell, with a TPMI) to use the first antenna port for the uplink communication, e.g., since after swapping antenna ports, the second antenna (which was previously associated with the second antenna port) may now be associated with the first antenna port, at least according to some embodiments.

Note also that, at least in some embodiments, determining whether to swap antenna ports for an uplink communication may be performed based at least in part on the number of transmission layers configured for the uplink transmission. For example, in some embodiments, the wireless device may check whether to swap antenna ports based at least in part on an uplink transmission being a single layer uplink MIMO transmission, such that only one antenna port is used to perform the uplink transmission. In such embodiments, it may be the case that the wireless device does not determine whether to swap antenna ports for a multi-layer uplink MIMO transmission, and that in such a scenario, the wireless device may use the antenna port configuration indicated by the TPMI without internal antenna port swapping.

Thus, at least according to some embodiments, the methods of FIGS. 5-6 may be used by a wireless device to manage uplink port selection with consideration of its wireless device design characteristics, at least in some instances. Note that it may be possible for the methods of FIGS. 5-6 to be used together, or for the methods of FIGS. 5-6 to be used independently, according to various embodiments.

FIGS. 7-13 and Additional Information

FIGS. 7-13 illustrate further aspects that might be used in conjunction with the methods of FIGS. 5-6 if desired. It should be noted, however, that the example details illustrated in and described with respect to FIGS. 7-13 are not intended to be limiting to the disclosure as a whole: numerous variations and alternatives to the details provided herein below are possible and should be considered within the scope of the disclosure.

In uplink MIMO operation, it may sometimes be possible that gNB TPMI selection is not optimal and can lead to performance downgrade. One possible reason may include use of equal SRS power in single layer mode.

Figure 7:
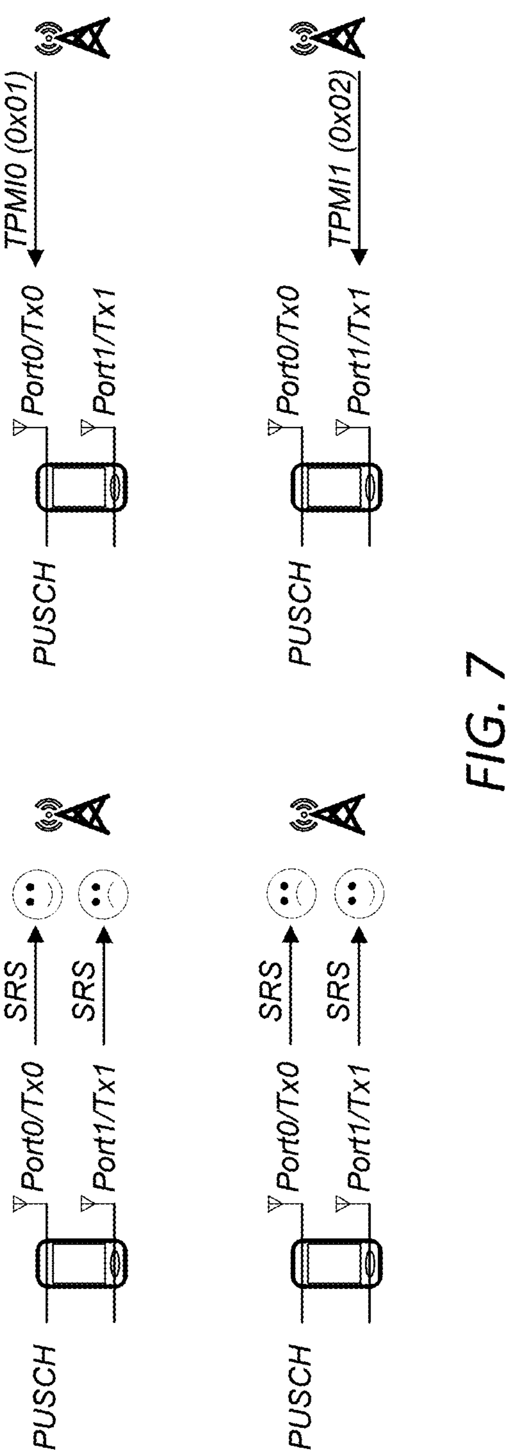
FIG. 7 illustrates aspects of possible SRS transmission and TPMI provision for a UE working in single layer mode, for example in a far cell scenario, according to some embodiments.

FIG. 7 illustrates aspects of possible SRS transmission and TPMI provision for a UE working in single layer mode, for example in a far cell scenario. The gNB may evaluate uplink channel conditions via SRS and use TMPI to select an antenna port for PUSCH. Thus, as shown, when Port0/Tx0 SRS is better than Port1/Tx1 SRS, the gNB may configure TPMI0 (0x01) for physical uplink shared channel (PUSCH) use, while when Port1/Tx1 SRS is better than Port0/Tx0 SRS, the gNB may configure TPMI1 (0x02) for physical uplink shared channel (PUSCH) use.

According to some embodiments, the TPMI configuration may be performed in accordance with table 7.3.1.1.2-4 in 3GPP TS 38.212 v. 17.5.0 and table 6.3.1.5-1 in 3GPP TS 38.211 v.17.5.0 and corresponding sections. For example, when TPMP index=0 is configured for single layer transmission using two antenna ports, the precoding matrix:

$$\frac{1}{\sqrt{2}}\begin{bmatrix}1\\0\end{bmatrix}$$

may be used such that port 0 is used in transmission and port 1 is not used, while when TPMP index=1 is configured for single layer transmission using two antenna ports, the precoding matrix:

$$\frac{1}{\sqrt{2}}\begin{bmatrix}0\\1\end{bmatrix}$$

may be used such that port 1 is used in transmission and port 0 is not used. Note that variations or alternatives to this example approach are also possible.

Figure 8:
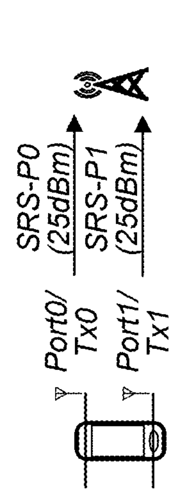
FIG. 8 illustrates example aspects of an equal SRS transmit power approach for both dual layer mode and single layer mode uplink MIMO operation, according to some embodiments.
Figure 8:
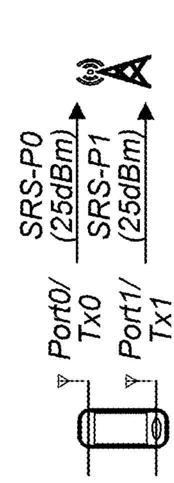
Figure 8:
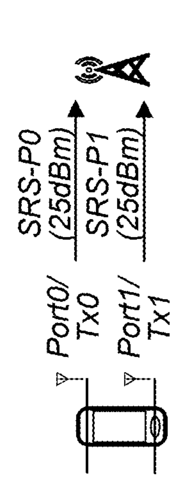

An equal power approach may be one possible option that can be used for SRS transmit power selection. FIG. 8 illustrates example aspects of such an approach for both dual layer mode and single layer mode uplink MIMO operation, according to some embodiments. As shown, in the dual layer mode, SRS may be transmitted using both antenna ports with equal power (e.g., 25 dBm, in the illustrated example). This may match the PUSCH maximum transmit power level (MTPL) (e.g., 25 dBM, in the illustrated example) for the antenna ports, such that the SRS may accurately reflect the PUSCH uplink status. In single layer mode, however, different antenna ports may potentially have different MTPL/Tx power. In this case, if the same SRS transmit power is used for both antenna ports, the gNB may mis-judge the best port based on this SRS transmission. For example, as shown, using an equal power approach, SRS may be transmitted using both antenna ports with equal power (e.g., 25 dBm, in the illustrated example), while the PUSCH MTPL for Port0 (e.g., 26.5 dBm, in the illustrated example) may be different than the MTPL for Port1 (e.g., 28 dBm, in the illustrated example), such that the SRS may not accurately reflect the PUSCH uplink status.

Figure 9:
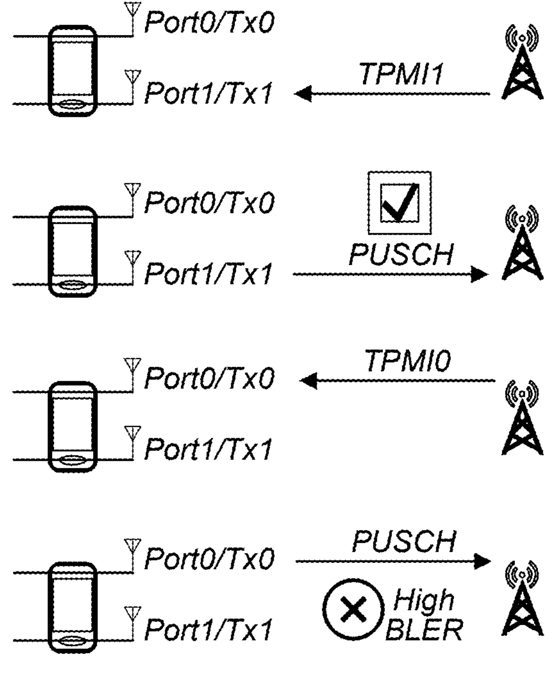
FIG. 9 illustrates example aspects of a possible scenario in which TPMI selection based on an equal SRS transmit power approach could lead to UE performance degradation, according to some embodiments.

FIG. 9 illustrates example aspects of a possible scenario in which TPMI selection based on such an approach could lead to UE performance degradation, according to some embodiments. As shown, in the illustrated scenario, TPMI1 may initially be selected, and correspondingly, Port1/Tx1 may be used for PUSCH transmission. At a subsequent time, the gNB may modify the TPMI selection such that TPMI0 is selected (e.g., based on equal power SRS transmissions), and correspondingly, Port0/Tx0 may be used for PUSCH transmission. However, the change to Port0 may be accompanied by high block error rate (BLER). At least in some instances, it may be possible that this could be avoided by using port specific power selection for SRS transmissions, for example if Tx1 has higher MTPL than Tx0, in which case use of a higher SRS transmit power for Tx1 than for Tx0 could have led the gNB to continue with the TPMI1 configuration that provided better performance.

Figure 10:
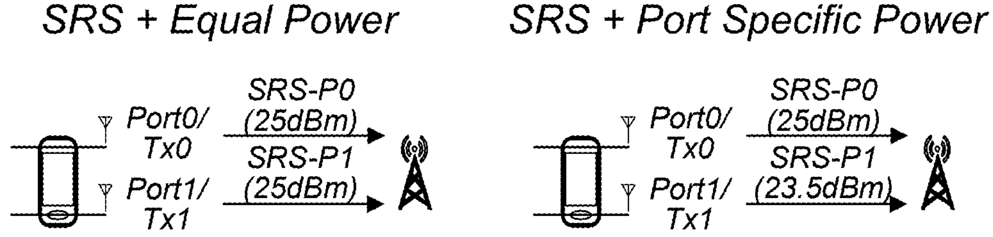
FIG. 10 illustrates an example comparison of a possible equal power based approach and a port specific power based approach for selecting SRS transmit power for single layer mode uplink MIMO operation, according to some embodiments.

FIG. 10 illustrates an example comparison of a possible equal power based approach and a port specific power based approach for selecting SRS transmit power for single layer mode uplink MIMO operation, according to some embodiments. As shown, in the equal power approach, and as previously noted, it may be the case that the same SRS transmit power (e.g., 25 dBm, in the illustrated scenario) may be used for both Port0 and Port1. In contrast, in the port specific power approach, the UE may report SRS for 2 Tx Ports with different power, which may be calculated based at least in part on port specific MTPL. This, in the illustrated example, 25 dBm transmit power may be used for SRS transmission on Port0, while 23.5 dBm transmit power may be used for SRS transmission on Port1.

Any of various possible techniques may be used to calculate such port specific SRS transmit power, according to various embodiments. As one such possibility, the power for a port may be equal to the MTPL for that port minus 3 dB. Thus, for example, for a wireless device with Port0 MTPL of 28 dBm and Port1 MTPL of 26.5 dBm, the following calculations may be used:

$$\text{Power } (srs-p0) = 28 \text{ dBm} - 3 \text{ dB} = 25 \text{ dBm}$$

$$\text{Power } (srs-p1) = 26.5 \text{ dBm} - 3 \text{ dB} = 23.5 \text{ dBm}$$

Note that a UE implementing such a port specific SRS transmit power calculation for single layer uplink MIMO operation may also use an equal SRS transmit power calculation for dual layer uplink MIMO operation, at least according to some embodiments. As one such possibility, the power for the ports may be equal to the greater of the MTPLs for the ports minus 3 dB. Thus, for example, for a wireless device with Port0 MTPL of 28 dBm and Port1 MTPL of 26.5 dBm, the following calculations may be used:

$$\text{Power } (srs-p0) = \text{Power } (srs-p1) = \text{Max } (28 \text{ dBm}, 26.5 \text{ dBm}) - 3 \text{ dB} = 25 \text{ dBm}$$

Such an approach may result in the SRS potentially reflecting each port more accurately, for example by including both path loss info and MTPL info (e.g., instead of just path loss info), which may benefit the gNB TMPI selection. At least in some embodiments, such a technique may be transparent to the gNB, e.g., with no need for negotiation with the gNB to implement the approach.

Figure 11:
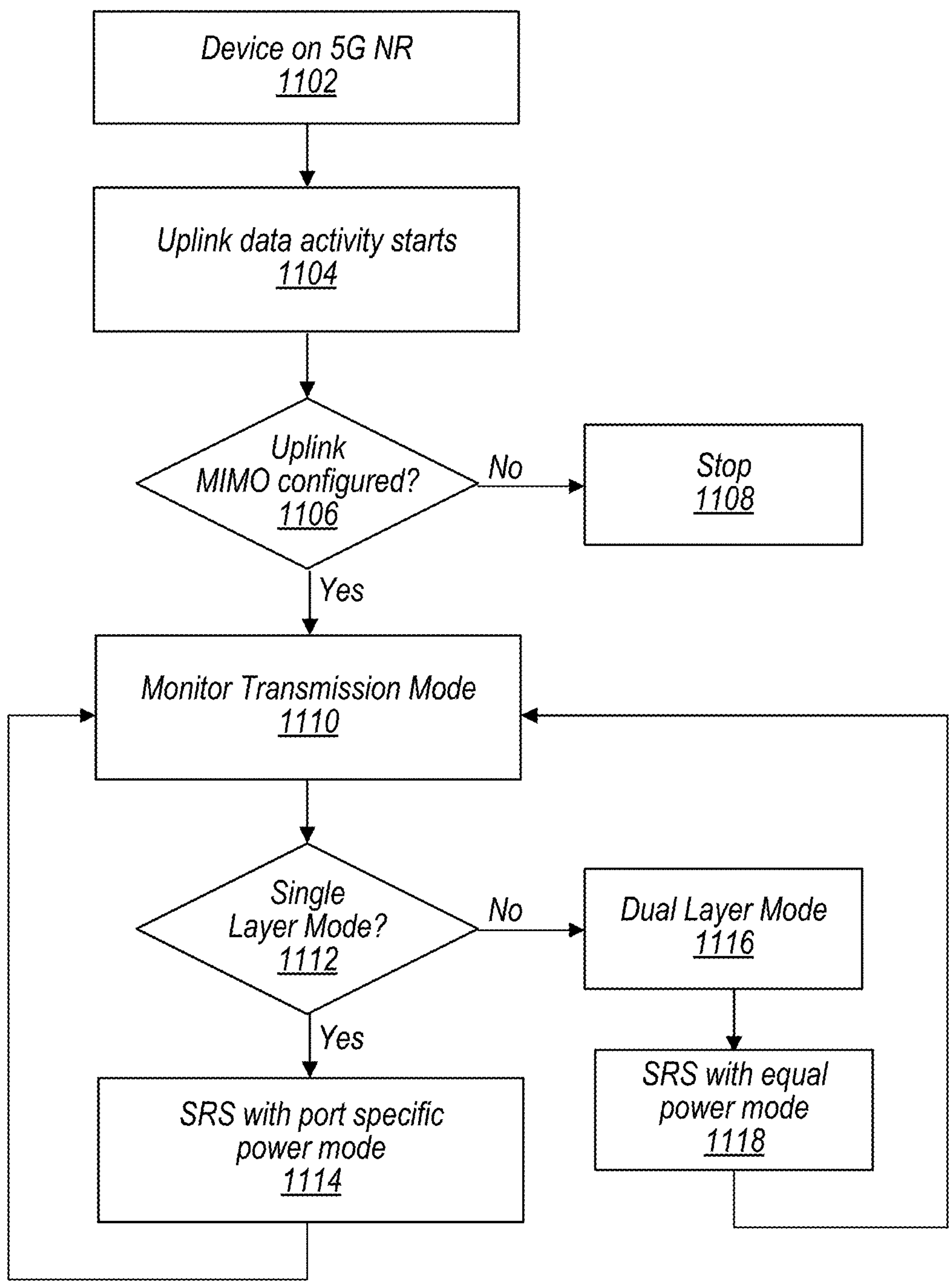
FIG. 11 is a flowchart diagram illustrating further details of a possible method for port specific SRS transmit power selection, according to some embodiments.

FIG. 11 is a flowchart diagram illustrating further details of a possible method for port specific SRS transmit power selection, according to some embodiments. As shown, in 1102, a device may be operating using 5G NR cellular communication. In 1104, uplink data activity may start. In 1106, the device may determine whether uplink MIMO is configured. If not, in 1108, the method may stop. If so, however, in 1110, the uplink MIMO transmission mode may be monitored. This may include checking, in 1112, whether single layer mode is configured. If so, in 1114, SRS may be transmitted using port specific power mode. If not, in 1116, the device may determine that dual layer mode is configured. Accordingly, in 1118, SRS may be transmitted using equal power mode.

Figure 12:
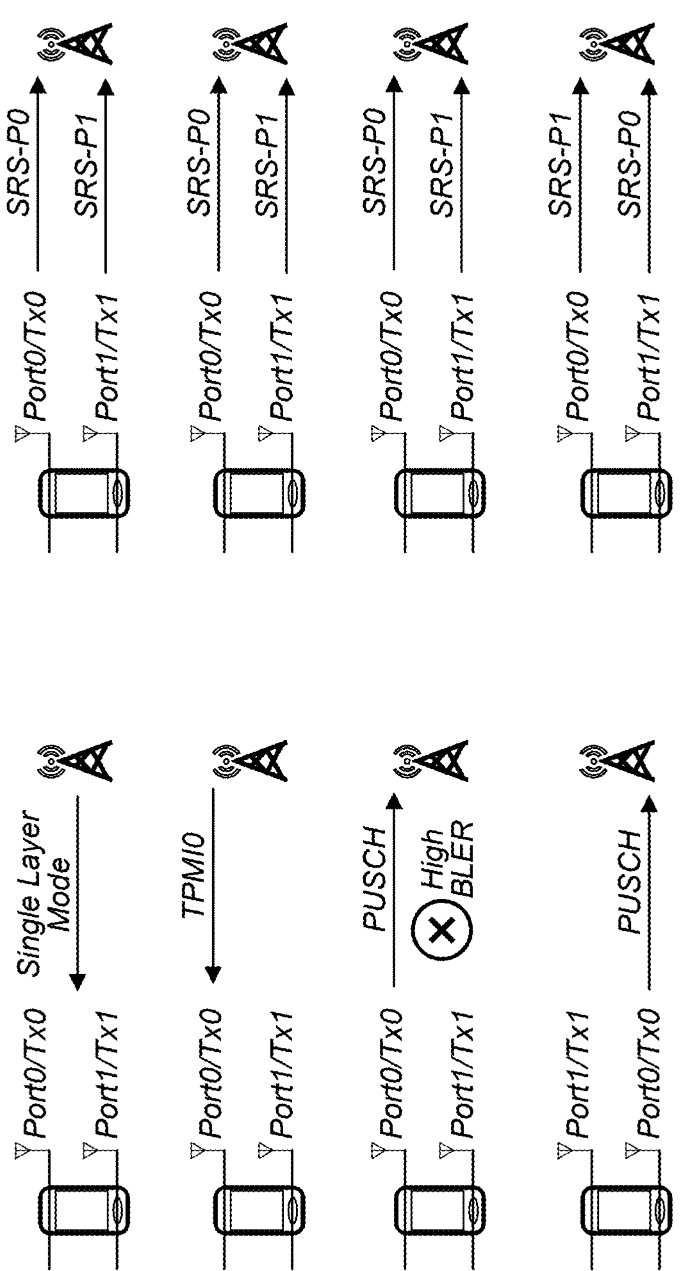
FIG. 12 illustrates example aspects of a possible scenario in which a UE could perform an antenna port swap, according to some embodiments.

As an additional or alternative technique for improving UE performance in single layer uplink MIMO operation (e.g., in view of the possibility that gNB TPMI selection for the UE results in sub-optimal performance), it may be possible for a UE to internally swap antenna ports in certain circumstances. For example, in a far cell scenario, if the gNB selected Tx port is determined to be worse than another Tx Port (e.g., an UL BLER is high), the UE may be able to swap antenna ports to attempt to remedy the situation. FIG. 12 illustrates example aspects of one such possible scenario, according to some embodiments. As shown, a UE may be configured in single layer mode for uplink MIMO operation, and initially configured with TPMI0. The UE may use the associated antenna port (Port0) for PUSCH transmission, which may lead to high BLER. Based on internal calculations, the UE may determine that the non-selected antenna port (Port1) may be likely to perform better, and so may autonomously swap the antenna ports (e.g., such that the antennas associated with Port and Port1 are switched). As a result, the antenna that is expected to perform better may be associated with the selected antenna port (Port 0) and is used for PUSCH transmission instead of the antenna that was originally associated with the selected antenna port.

A UE may determine whether to perform such an antenna port swap in any of a variety of possible ways. As one possibility, an approach may be used in which a "rank" is calculated for each antenna port, based on the MTPL and RSRP for the antenna port. Thus, the following calculations could be performed:

$$\text{Rank } (Port0) = MTPL \ (Port0) + RSRP \ (Port0)$$

$$\text{Rank } (Port1) = MTPL \ (Port1) + RSRP \ (Port1)$$

Using this information, one or more conditions could be configured by the device to trigger an antenna port swap. For example, for a scenario in which antenna port 0 is currently selected, the following conditions could be used:

$$\text{Condition } A\text{: Rank } (Port0) - \text{Rank } (Port1) < Threshold1 \text{ (e.g., } -5 \text{ dB) \&\& } UL \text{ BLER} > \text{Threshold (e.g., 20\%)}$$

$$\text{Condition } B\text{: Rank } (Port0) - \text{Rank } (Port1) < Threshold2 \text{ (e.g., } -10 \text{ dB)}$$

As another (additional or alternative) possibility, an approach may be used in which hand grip information forms a basis for a condition for performing an antenna port swap. For example, certain hand grip conditions may be defined in which one antenna port has more performance degradation than another antenna port. Thus, in a scenario in which antenna port 0 is currently selected, the following condition could be used:

Condition C: Port0 has a hand grip condition indicating worse performance than Port1

Figure 13:
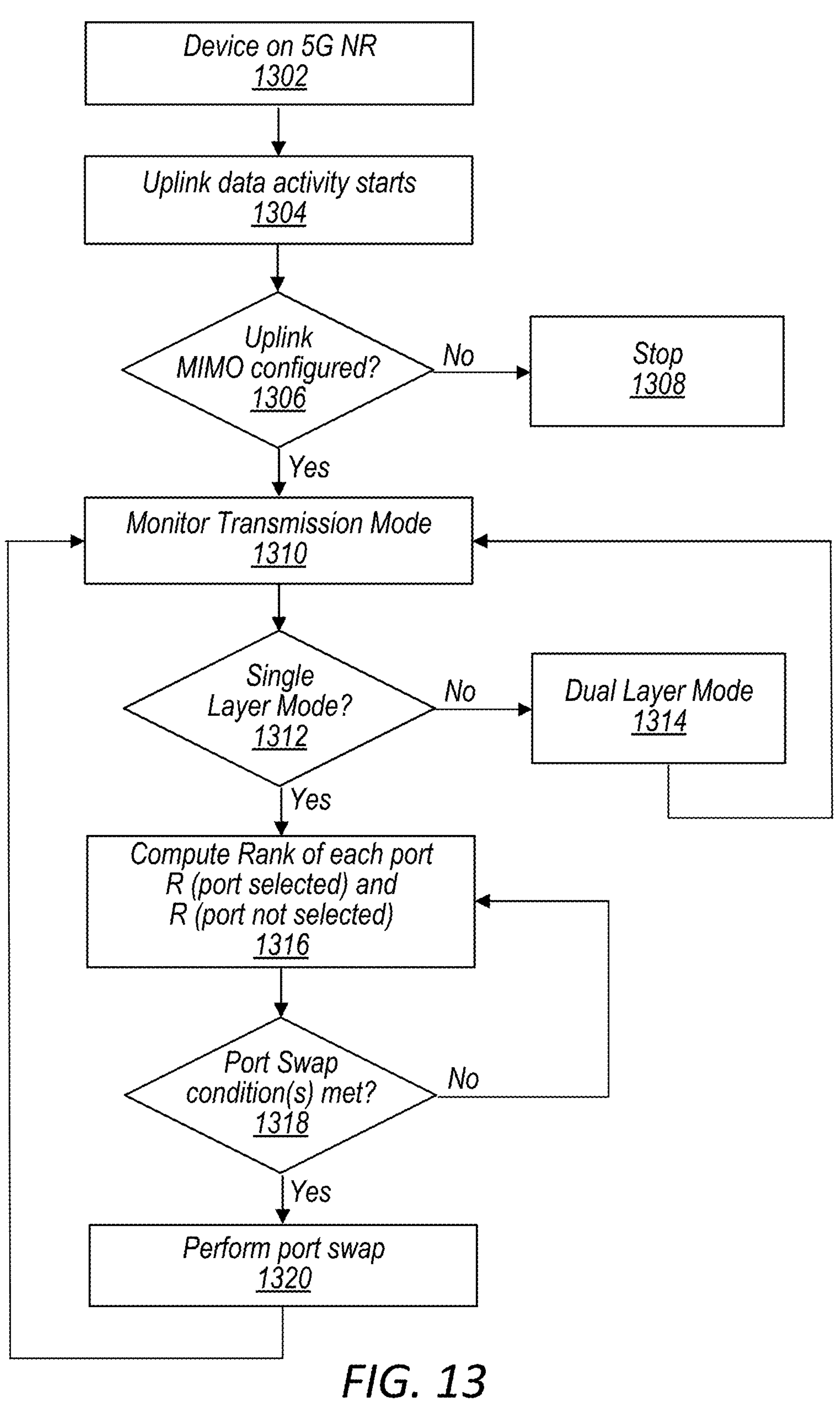
FIG. 13 is a flowchart diagram illustrating further details of a possible method for antenna port swapping, according to some embodiments.

FIG. 13 is a flowchart diagram illustrating further details of a possible method for antenna port swapping, according to some embodiments. As shown, in 1302, a device may be operating using 5G NR cellular communication. In 1304, uplink data activity may start. In 1306, the device may determine whether uplink MIMO is configured. If not, in 1308, the method may stop. If so, however, in 1310, the uplink MIMO transmission mode may be monitored. This may include checking, in 1312, whether single layer mode is configured. If not, in 1314, the method may return to step 1310 and the MIMO transmission mode may again be monitored. If single layer mode is configured, in 1316, the rank for each antenna port may be computed, including R (port selected) and R (port not selected). In 1318, the device may determine if any port swap conditions have been met. As previously noted, the port swap conditions could include any or all of condition A, condition B, or condition C described herein, among various other possible conditions. If no port swap conditions are met, the method may return to step 1316 and the rank for each antenna port may be reevaluated (e.g., periodically or as triggered by configured events, such as when new measurements are available). If any port swap conditions are met, in 1320, the device may perform an antenna port swap, for example such that the antenna elements that are associated with the antenna ports of the device are switched.

In the following further example embodiments are provided.

One set of embodiments may include a wireless device, comprising: at least a first antenna port and a second antenna port; a radio operably coupled to at least the first antenna port and the second antenna port; and a processor operably coupled to the radio; wherein the wireless device is configured to: select a sounding reference signals (SRS) transmit power calculation method from multiple SRS transmit power calculation methods; determine at least a first SRS transmit power for the first antenna port and a second SRS transmit power for the second antenna port using the selected SRS transmit power calculation method; and transmit SRS using at least the first antenna port at the first SRS transmit power and the second antenna port at the second SRS transmit power.

According to some embodiments, the SRS transmit power calculation method is selected based at least in part on a number of uplink multiple input multiple output (MIMO) transmission layers configured for the wireless device.

According to some embodiments, for one uplink MIMO transmission layer, a SRS transmit power calculation method that includes independently calculating the first SRS transmit power for the first antenna port and the second SRS transmit power for the second antenna port is selected.

According to some embodiments, according to the SRS transmit power calculation method for one uplink MIMO transmission layer, the first SRS transmit power for the first antenna port is calculated based at least in part on a maximum transmit power level for the first antenna port and the second SRS transmit power for the second antenna port is calculated based at least in part on a maximum transmit power level for the second antenna port.

According to some embodiments, the maximum transmit power level for the first antenna port is different than the maximum transmit power level for the second antenna port.

According to some embodiments, for two uplink MIMO transmission layers, a SRS transmit power calculation method that includes jointly calculating the first SRS transmit power for the first antenna port and the second SRS transmit power for the second antenna port is selected.

According to some embodiments, according to the SRS transmit power calculation method for two uplink MIMO transmission layers, the joint calculation of the first SRS transmit power for the first antenna port and the second SRS transmit power for the second antenna port is based at least in part on a lesser value of a maximum transmit power level for the first antenna port and a maximum transmit power level for the second antenna port.

Another set of embodiments may include a method, comprising: by a wireless device: receiving information configuring a first sounding reference signal (SRS) transmission; determining a first SRS transmit power for a first antenna port; determining a second SRS transmit power for a second antenna port, wherein the second SRS transmit power is different than the first SRS transmit power; and performing the first SRS transmission using the first antenna port at the first SRS transmit power and using the second antenna port at the second SRS transmit power.

According to some embodiments, the first SRS transmit power is determined based at least in part on a maximum transmit power level for the first antenna port, wherein the second SRS transmit power is determined based at least in part on a maximum transmit power level for the second antenna port.

According to some embodiments, the first SRS transmit power is determined as the maximum transmit power level for the first antenna port reduced by a configured amount, wherein the second SRS transmit power is determined as the maximum transmit power level for the second antenna port reduced by the configured amount.

According to some embodiments, the first SRS transmit power and the second SRS transmit power are determined separately based at least in part on a number of transmission layers configured for uplink multiple input multiple output (MIMO) for the wireless device.

According to some embodiments, the first SRS transmission is for a single-layer transmission mode, wherein the first SRS transmit power and the second SRS transmit power are determined separately based at least in part on the SRS transmission being for the single-layer transmission mode.

According to some embodiments, the method further comprises: receiving information configuring a second SRS transmission, wherein the second SRS transmission is for a dual-layer transmission mode; determining SRS transmit power jointly for the first antenna port and the second antenna port for the second SRS transmission based at least in part on the second SRS transmission being for the dual-layer transmission mode; and performing the second SRS transmission using the first antenna port at the jointly determined SRS transmit power and using the second antenna port at the jointly determined SRS transmit power.

Yet another set of embodiments may include an apparatus, comprising: a processor configured to cause a wireless device to: receive information configuring uplink multiple input multiple output (MIMO) operation for the wireless device; determine a transmission mode for the uplink MIMO operation; and transmit sounding reference signals (SRS) using at least a first antenna port and a second antenna port, wherein SRS transmit powers for the first antenna port and the second antenna port are determined based at least in part on the transmission mode for the uplink MIMO operation.

According to some embodiments, for a single layer transmission mode, the SRS transmit powers for the first antenna port and the second antenna port are separately determined.

According to some embodiments, for the single layer transmission mode, SRS transmit power for the first antenna port is determined based at least in part on a maximum transmit power level for the first antenna port and SRS transmit power for the second antenna port is separately determined based at least in part on a maximum transmit power level for the second antenna port.

According to some embodiments, the maximum transmit power level for the first antenna port is different than the maximum transmit power level for the second antenna port.

According to some embodiments, for a dual layer transmission mode, the SRS transmit powers for the first antenna port and the second antenna port are jointly determined.

According to some embodiments, wherein for the dual layer transmission mode, SRS transmit powers for the first antenna port and the second antenna port are jointly determined based at least in part on both a maximum transmit power level for the first antenna port and a maximum transmit power level for the second antenna port.

According to some embodiments, for a single layer transmission mode, SRS transmit power for the first antenna port is different than SRS transmit power for the second antenna port, wherein for a dual layer transmission mode, SRS transmit power for the first antenna port and SRS transmit power for the second antenna port are equal.

Still another set of embodiments may include an apparatus, comprising: a processor configured to cause a wireless device to: receive configuration information indicating to use a first antenna port of the wireless device for a single layer uplink multiple input multiple output (MIMO) communication, wherein the first antenna port is associated with a first antenna of the wireless device, wherein a second antenna port of the wireless device is associated with a second antenna of the wireless device; swap the first antenna port and the second antenna port such that the first antenna port is associated with the second antenna and the second antenna port is associated with the first antenna; and perform the single layer uplink MIMO communication using the second antenna.

According to some embodiments, the processor is further configured to cause the wireless device to: determine to swap the first antenna port and the second antenna for the single layer uplink MIMO communication based at least in part on a maximum transmit power level for the first antenna port and a maximum transmit power level for the second antenna port.

According to some embodiments, the processor is further configured to cause the wireless device to: determine to swap the first antenna port and the second antenna port for the single layer uplink MIMO communication based at least in part on reference signal received power (RSRP) for the first antenna port and RSRP for the second antenna port.

According to some embodiments, the processor is further configured to cause the wireless device to: determine to swap the first antenna port and the second antenna port for the single layer uplink MIMO communication based at least in part on an error rate for previous single layer uplink MIMO communication using the first antenna port.

According to some embodiments, the processor is further configured to cause the wireless device to: receive hand grip information for the wireless device; and determine to swap the first antenna port and the second antenna port for the single layer uplink MIMO communication based at least in part on the hand grip information for the wireless device.

According to some embodiments, the processor is further configured to cause the wireless device to: determine a first rank for the first antenna port based at least in part on a maximum transmit power level for the first antenna port and reference signal received power (RSRP) for the first antenna port; determine a second rank for the second antenna port based at least in part on a maximum transmit power level for the second antenna port and RSRP for the second antenna port; and determine to swap the first antenna port and the second antenna port for the single layer uplink MIMO communication based at least in part on the first rank for the first antenna port and the second rank for the second antenna port.

According to some embodiments, the first antenna port and the second antenna port are swapped for the single layer uplink MIMO communication based at least in part on the first rank for the first antenna port being less than the second rank for the second antenna port by at least a configured threshold.

According to some embodiments, the first antenna port and the second antenna port are swapped for the single layer uplink MIMO communication based at least in part on the first rank for the first antenna port being less than the second rank for the second antenna port by at least a rank threshold and an error rate for previous single layer uplink MIMO communication using the first antenna port being greater than an error rate threshold.

A further set of embodiments may include a wireless device, comprising: at least a first antenna and a second antenna; a radio operably coupled to at least the first antenna and the second antenna; and a processor operably coupled to the radio; wherein the wireless device is configured to: receive information configuring single layer uplink multiple input multiple output (MIMO) operation for the wireless device; receive information configuring a first antenna port for the single layer uplink MIMO operation, wherein the first antenna port is associated with the first antenna; perform a first single layer uplink MIMO transmission using the first antenna based at least in part on the information configuring the first antenna port for the single layer uplink MIMO operation; determine whether to swap antenna ports for the single layer uplink MIMO operation; and perform a second single layer uplink MIMO transmission using the second antenna based at least in part on determining whether to swap antenna ports for the single layer uplink MIMO operation.

According to some embodiments, whether to swap antenna ports for the single layer uplink MIMO operation is determined based at least in part on a maximum transmit power level for the first antenna port and a maximum transmit power level for the second antenna port.

According to some embodiments, whether to swap antenna ports for the single layer uplink MIMO operation is determined based at least in part on a reference signal power level for the first antenna port and a reference signal power level for the second antenna port.

According to some embodiments, whether to swap antenna ports for the single layer uplink MIMO operation is determined based at least in part on an error rate for the first single layer uplink MIMO transmission using the first antenna port.

According to some embodiments, whether to swap antenna ports for the single layer uplink MIMO operation is determined based at least in part on one or more wireless device conditions.

According to some embodiments, the one or more wireless device conditions include a hand grip condition indicating that the first antenna port is more obstructed by a hand grip of a user of the wireless device than the second antenna port.

According to some embodiments, the wireless device is further configured to: determine a first metric value for the first antenna port based on a maximum transmit power level for the first antenna port and a reference signal received power for the first antenna port; and determine a second metric value for the second antenna port based on a maximum transmit power level for the second antenna port and a reference signal received power for the second antenna port, wherein whether to swap antenna ports for the single layer uplink MIMO operation is determined based at least in part on the first metric value and the second metric value.

A still further set of embodiments may include a method, comprising: by a wireless device: receiving information configuring a first antenna port for an uplink communication, wherein the first antenna port is associated with a first antenna, wherein a second antenna port is associated with a second antenna; determining to swap antenna ports for the uplink communication, wherein after swapping antenna ports, the first antenna port is associated with the second antenna and the second antenna port is associated with the first antenna; and performing the uplink communication using the second antenna based at least in part on determining to swap antenna ports for the uplink communication.

According to some embodiments, the uplink communication comprises a single layer uplink multiple input multiple output (MIMO) communication.

According to some embodiments, the method further comprises: determining a first metric value for the first antenna port based at least in part on a maximum transmit power level for the first antenna port and a reference signal received power for the first antenna port; and determining a second metric value for the second antenna port based at least in part on a maximum transmit power level for the second antenna port and a reference signal received power for the second antenna port, wherein determining to swap antenna ports for the uplink communication is based at least in part on the first metric value and the second metric value.

According to some embodiments, determining to swap antenna ports for the uplink communication is based on one or more of: the second metric value being greater than the first metric value by at least a first threshold and an error rate for uplink communication using the first antenna port being greater than an error rate threshold; or the second metric value being greater than the first metric value by at least a second threshold.

According to some embodiments, determining to swap antenna ports for the uplink communication is based at least in part on hand grip information for the wireless device.

A further example embodiment may include a method, comprising: performing, by a wireless device, any or all parts of the preceding examples.

Another example embodiment may include a device, comprising: an antenna; a radio coupled to the antenna; and a processing element operably coupled to the radio, wherein the device is configured to implement any or all parts of the preceding examples.

A further example set of embodiments may include a non-transitory computer accessible memory medium comprising program instructions which, when executed at a device, cause the device to implement any or all parts of any of the preceding examples.

A still further example set of embodiments may include a computer program comprising instructions for performing any or all parts of any of the preceding examples.

Yet another example set of embodiments may include an apparatus comprising means for performing any or all of the elements of any of the preceding examples.

Still another example set of embodiments may include an apparatus comprising a processor configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A wireless device, comprising:
at least a first antenna port and a second antenna port;
a radio operably coupled to at least the first antenna port and the second antenna port; and
a processor operably coupled to the radio;
wherein the wireless device is configured to:
select a sounding reference signals (SRS) transmit power calculation method from multiple SRS transmit power calculation methods;
determine at least a first SRS transmit power for the first antenna port and a second SRS transmit power for the second antenna port using the selected SRS transmit power calculation method; and
transmit SRS using at least the first antenna port at the first SRS transmit power and the second antenna port at the second SRS transmit power.

2. The wireless device of claim 1,
wherein the SRS transmit power calculation method is selected based at least in part on a number of uplink multiple input multiple output (MIMO) transmission layers configured for the wireless device.

3. The wireless device of claim 2,
wherein for one uplink MIMO transmission layer, a SRS transmit power calculation method that includes independently calculating the first SRS transmit power for the first antenna port and the second SRS transmit power for the second antenna port is selected.

4. The wireless device of claim 3,
wherein, according to the SRS transmit power calculation method for one uplink MIMO transmission layer, the first SRS transmit power for the first antenna port is calculated based at least in part on a maximum transmit power level for the first antenna port and the second SRS transmit power for the second antenna port is calculated based at least in part on a maximum transmit power level for the second antenna port.

5. The wireless device of claim 4, wherein the maximum transmit power level for the first antenna port is different than the maximum transmit power level for the second antenna port.

6. The wireless device of claim 2, wherein for two uplink MIMO transmission layers, a SRS transmit power calculation method that includes jointly calculating the first SRS transmit power for the first antenna port and the second SRS transmit power for the second antenna port is selected.

7. The wireless device of claim 6, wherein, according to the SRS transmit power calculation method for two uplink MIMO transmission layers, the joint calculation of the first SRS transmit power for the first antenna port and the second SRS transmit power for the second antenna port is based at least in part on a lesser value of a maximum transmit power level for the first antenna port and a maximum transmit power level for the second antenna port.

8. A method for operation in wireless communication, comprising:

receiving information configuring a first sounding reference signal (SRS) transmission;

determining a first SRS transmit power for a first antenna port;

determining a second SRS transmit power for a second antenna port, wherein the second SRS transmit power is different than the first SRS transmit power; and performing the first SRS transmission using the first antenna port at the first SRS transmit power and using the second antenna port at the second SRS transmit power.

9. The method of claim 8, wherein the first SRS transmit power is determined based at least in part on a maximum transmit power level for the first antenna port, wherein the second SRS transmit power is determined based at least in part on a maximum transmit power level for the second antenna port.

10. The method of claim 9, wherein the first SRS transmit power is determined as the maximum transmit power level for the first antenna port reduced by a configured amount, wherein the second SRS transmit power is determined as the maximum transmit power level for the second antenna port reduced by the configured amount.

11. The method of claim 8, wherein the first SRS transmit power and the second SRS transmit power are determined separately based at least in part on a number of transmission layers configured for uplink multiple input multiple output (MIMO).

12. The method of claim 8, wherein the first SRS transmission is for a single-layer transmission mode, wherein the first SRS transmit power and the second SRS transmit power are determined separately based at least in part on the SRS transmission being for the single-layer transmission mode.

13. The method of claim 8, wherein the method further comprises:

receiving information configuring a second SRS transmission, wherein the second SRS transmission is for a dual-layer transmission mode;

determining SRS transmit power jointly for the first antenna port and the second antenna port for the second SRS transmission based at least in part on the second SRS transmission being for the dual-layer transmission mode; and performing the second SRS transmission using the first antenna port at the jointly determined SRS transmit power and using the second antenna port at the jointly determined SRS transmit power.

14. A processor comprising memory configured to cause the processor to:

receive information configuring uplink multiple input multiple output (MIMO) operation;

determine a transmission mode for the uplink MIMO operation; and generate sounding reference signals (SRS) configured for transmission using at least a first antenna port and a second antenna port, wherein SRS transmit powers for the first antenna port and the second antenna port are determined based at least in part on the transmission mode for the uplink MIMO operation.

15. The processor of claim 14, wherein for a single layer transmission mode, the SRS transmit powers for the first antenna port and the second antenna port are separately determined.

16. The processor of claim 15, wherein for the single layer transmission mode, SRS transmit power for the first antenna port is determined based at least in part on a maximum transmit power level for the first antenna port and SRS transmit power for the second antenna port is separately determined based at least in part on a maximum transmit power level for the second antenna port.

17. The processor of claim 16, wherein the maximum transmit power level for the first antenna port is different than the maximum transmit power level for the second antenna port.

18. The processor of claim 14, wherein for a dual layer transmission mode, the SRS transmit powers for the first antenna port and the second antenna port are jointly determined.

19. The processor of claim 18, wherein for the dual layer transmission mode, SRS transmit powers for the first antenna port and the second antenna port are jointly determined based at least in part on both a maximum transmit power level for the first antenna port and a maximum transmit power level for the second antenna port.

20. The processor of claim 14, wherein for a single layer transmission mode, SRS transmit power for the first antenna port is different than SRS transmit power for the second antenna port, wherein for a dual layer transmission mode, SRS transmit power for the first antenna port and SRS transmit power for the second antenna port are equal.

* * * * *